US009244676B2

(12) United States Patent
Kamble et al.

(10) Patent No.: US 9,244,676 B2
(45) Date of Patent: Jan. 26, 2016

(54) VIRTUAL MACHINE BASED CONTROLLER AND UPGRADE MECHANISM

(71) Applicant: LENOVO ENTERPRISE SOLUTIONS (SINGAPORE) PTE. LTD., Singapore (SG)

(72) Inventors: Keshav G. Kamble, Fremont, CA (US); Dar-Ren Leu, San Jose, CA (US); Vijoy A. Pandey, Saan Jose, CA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/072,268

(22) Filed: Nov. 5, 2013

(65) Prior Publication Data

US 2014/0101652 A1 Apr. 10, 2014

Related U.S. Application Data

(63) Continuation of application No. 13/646,499, filed on Oct. 5, 2012.

(51) Int. Cl.
*G06F 9/445* (2006.01)
*G06F 9/455* (2006.01)

(52) U.S. Cl.
CPC .............. *G06F 8/67* (2013.01); *G06F 9/45558* (2013.01); *G06F 2009/45562* (2013.01)

(58) Field of Classification Search
CPC G06F 8/67; G06F 9/45558; G06F 2009/4557
See application file for complete search history.

(56) References Cited

U.S. PATENT DOCUMENTS

| 7,292,535 | B2 | 11/2007 | Folkes et al. |
| 7,613,749 | B2 | 11/2009 | Flynn, Jr. et al. |
| 7,685,251 | B2 | 3/2010 | Houlihan et al. |
| 7,784,053 | B2 * | 8/2010 | Casey ...................... G06F 9/50 718/1 |
| 7,996,484 | B2 | 8/2011 | Mundkur et al. |
| 8,082,468 | B1 | 12/2011 | Backensto et al. |
| 8,156,301 | B1 * | 4/2012 | Khandelwal ........ G06F 9/45558 711/112 |
| 8,762,992 | B2 * | 6/2014 | Krishnamurthy ... G06F 9/45558 707/633 |
| 8,793,684 | B2 * | 7/2014 | Breitgand ........... G06F 9/45558 718/1 |
| 9,003,392 | B2 * | 4/2015 | Arcese .................... G06F 9/455 717/168 |

(Continued)

OTHER PUBLICATIONS

Lagar-Cavilla et al., SnowFlock: rapid virtual machine cloning for cloud computing, Apr. 2009, 12 pages.*

(Continued)

*Primary Examiner* — Thuy Dao
(74) *Attorney, Agent, or Firm* — Edward J. Lenart; Katherine S. Brown; Kennedy Lenart Spraggins LLP

(57) ABSTRACT

High availability for a network may be achieved, for example, during a hitless upgrade by creating a replica controller virtual machine of an operating controller virtual machine (source controller). The replica controller virtual machine may be on a same or different server as the source controller virtual machine. The replica controller virtual machine may be copied with processes present in the source controller virtual machine and synchronized for runtime state. Upgrades or changes to software applications run in the source controller virtual machine may be provided to the replica controller virtual machine. Once enabled, the replica controller virtual machine may be operated without suspension of the source controller virtual machine.

4 Claims, 8 Drawing Sheets

(56) References Cited

U.S. PATENT DOCUMENTS

| | | |
|---|---|---|
| 2005/0268298 A1* | 12/2005 | Hunt .................... G06F 9/4856 718/1 |
| 2007/0214456 A1* | 9/2007 | Casey et al. .................. 718/100 |
| 2008/0189468 A1 | 8/2008 | Schmidt et al. |
| 2010/0165877 A1 | 7/2010 | Shukla et al. |
| 2010/0250908 A1* | 9/2010 | Amann et al. .................... 713/1 |
| 2011/0205904 A1 | 8/2011 | Nakagawa |
| 2011/0307886 A1 | 12/2011 | Thanga et al. |
| 2012/0030670 A1 | 2/2012 | Vijay et al. |
| 2012/0054731 A1 | 3/2012 | Aravamudan et al. |
| 2012/0102480 A1* | 4/2012 | Hopmann et al. ............ 717/172 |
| 2012/0240110 A1* | 9/2012 | Breitgand et al. ................ 718/1 |
| 2013/0167145 A1* | 6/2013 | Krishnamurthy ... G06F 9/45558 718/1 |

OTHER PUBLICATIONS

Bose et al., CloudSpider: Combining Replication with Scheduling for Optimizing Live Migration of Virtual Machines across Wide Area Networks, May 2001, 10 pages.*

Office Action in U.S. Appl. No. 13/646,499, dated Sep. 24, 2014.

* cited by examiner

VIRTUAL MACHINE BASED CONTROLLER AND UPGRADE MECHANISM

RELATED APPLICATIONS

The present continuation application claims the benefit of priority of U.S. application Ser. No. 13/646,499, filed Oct. 5, 2012, which application is incorporated herein by reference in its entirety.

BACKGROUND

The present invention relates to network maintenance, and more specifically, to a virtual machine based controller and upgrade mechanism.

In networking applications, controller failure may cause system downtime. It may be desirable to provide High Availability mechanisms (HA) to prevent downtime whenever possible. Typically HA designs and implementation are available for physical machines. Achieving HA where the controller is virtual machine (VM) based application or a virtual Machine itself may present a new set of challenges. Equally challenging may be hitless upgrades of these controllers from one version to the other while keeping them running. Typically, as new software versions are patched into a system, one controller's operation may be stopped while implementing the upgraded controller. Thus, this may warrant the need to provide notice to users on the system of a scheduled network downtime. In some cases, bringing the network and system down to patch in an upgrade may include testing and debugging of the upgraded software before the system can be brought back online. As may be appreciated, this can result in considerably lengthy downtime.

SUMMARY

According to one embodiment of the present invention, a computer program product for providing high availability in a network, comprises a computer readable storage medium having computer readable program code embodied therewith. The computer readable program code is configured to operate a first controller virtual machine on a server. The first controller virtual machine may be replicated into a replica controller virtual machine. The replica controller virtual machine may be enabled. The first controller virtual machine may be synchronized with the replica controller virtual machine. The replica controller virtual machine may be operated without suspending the first controller.

According to another embodiment of the present invention, a network comprises a first controller virtual machine. A second controller virtual machine may be in communication with the first controller virtual machine. A server may include at least the first controller virtual machine. The second controller virtual machine may be a replica of the first controller virtual machine. The first controller virtual machine and second controller virtual machine may be synchronized for runtime state. The second controller virtual machine may be configured to operate without suspension of the first controller virtual machine.

According to yet another embodiment of the present invention, a method of installing a software patch in a system comprises operating a first controller virtual machine on a network server. A time to install the software patch may be determined. The first controller virtual machine may be replicated into a replica controller virtual machine in the system. The replica controller virtual machine may include the software patch. The replica controller virtual machine may be enabled. The first controller virtual machine may be synchronized with the replica controller virtual machine. The replica controller virtual machine may be operated without suspending the first controller virtual machine.

According to yet another embodiment of the present invention, an architecture providing an In Service Software Upgrade (ISSU) comprises an operating system, a first version of an application process being run by the operating system; a second version of the application process being run by the operating system on a same physical server as the first version of the application process; and an inter process communication (IPC) interface on each of the first version of the application process and the second version of the application process. The IPC interface may be configured to establish communication between the first version of the application process and the second version of the application process. The first version of the application process may synchronize with the second version of the application process through respective IPC interfaces.

DETAILED DESCRIPTION

Figure 1:
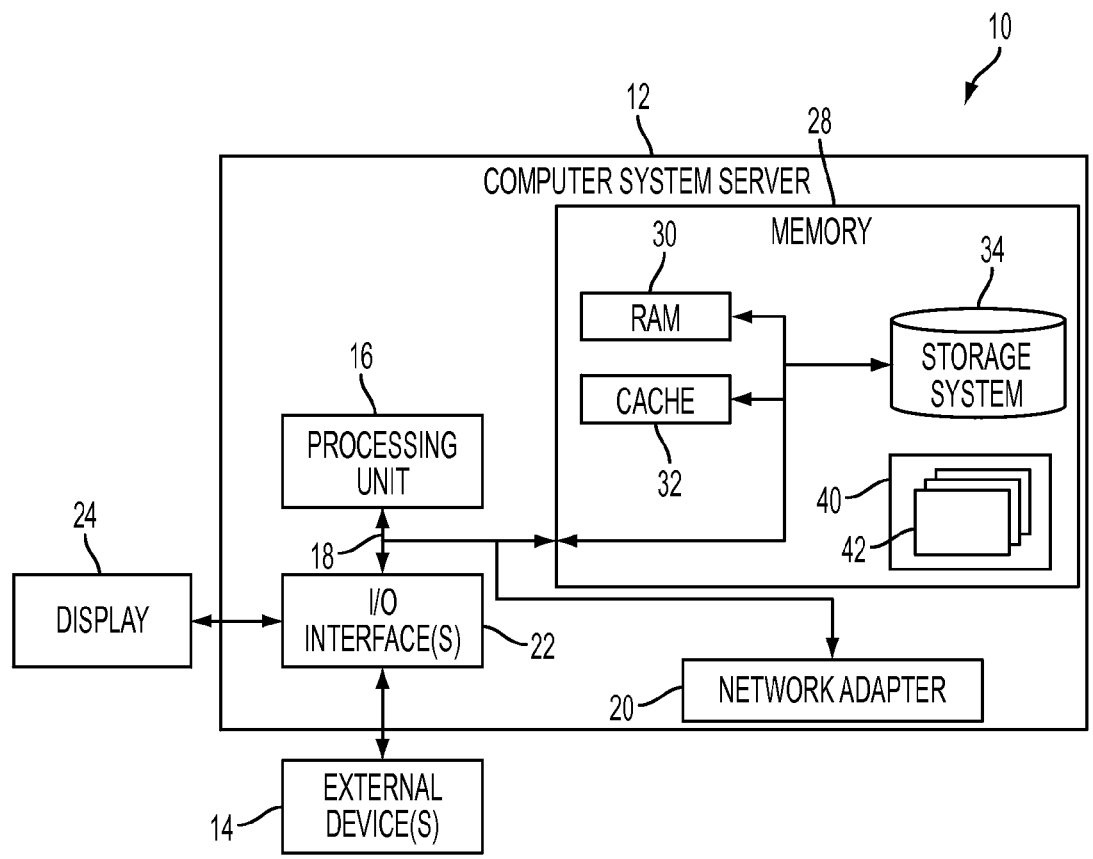
FIG. 1 depicts a cloud computing node according to an embodiment of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email).

The consumer need not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer need not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications.

The consumer need not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12;

and/or any devices (e.g., network card, modem, etc.) that enable the computer system/server 12 to communicate with one or more other computing devices. Such communication can occur via Input/Output (110) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
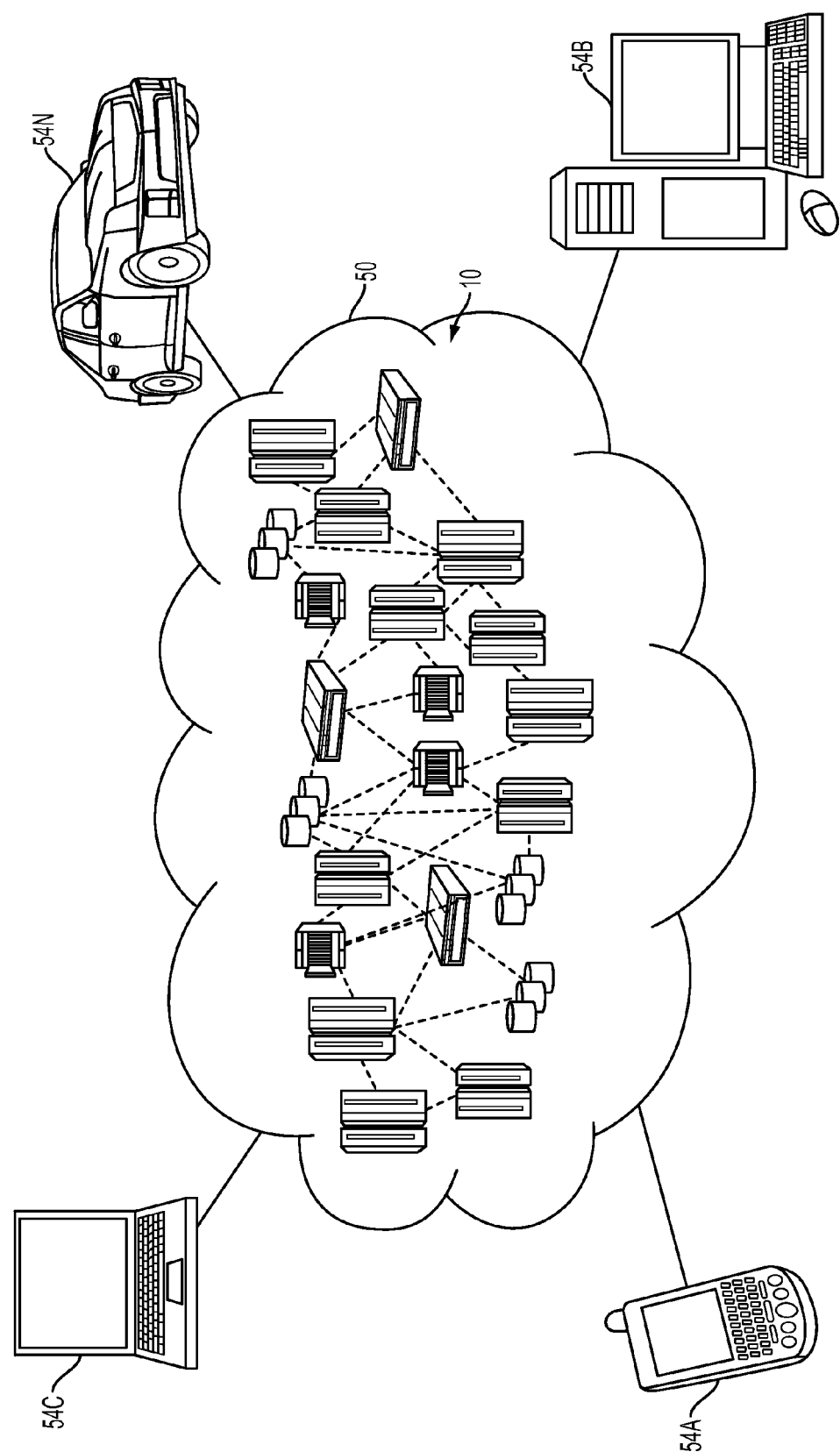
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone 54A, desktop computer 54B, laptop computer 54C, and/or a automobile computer system 54N, may communicate. The nodes 10 may communicate with one another. They may be grouped physically or virtually, in one or more networks, such as Private, Community, Public, or Hybrid clouds as described hereinabove, or a combination thereof. This allows cloud the computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
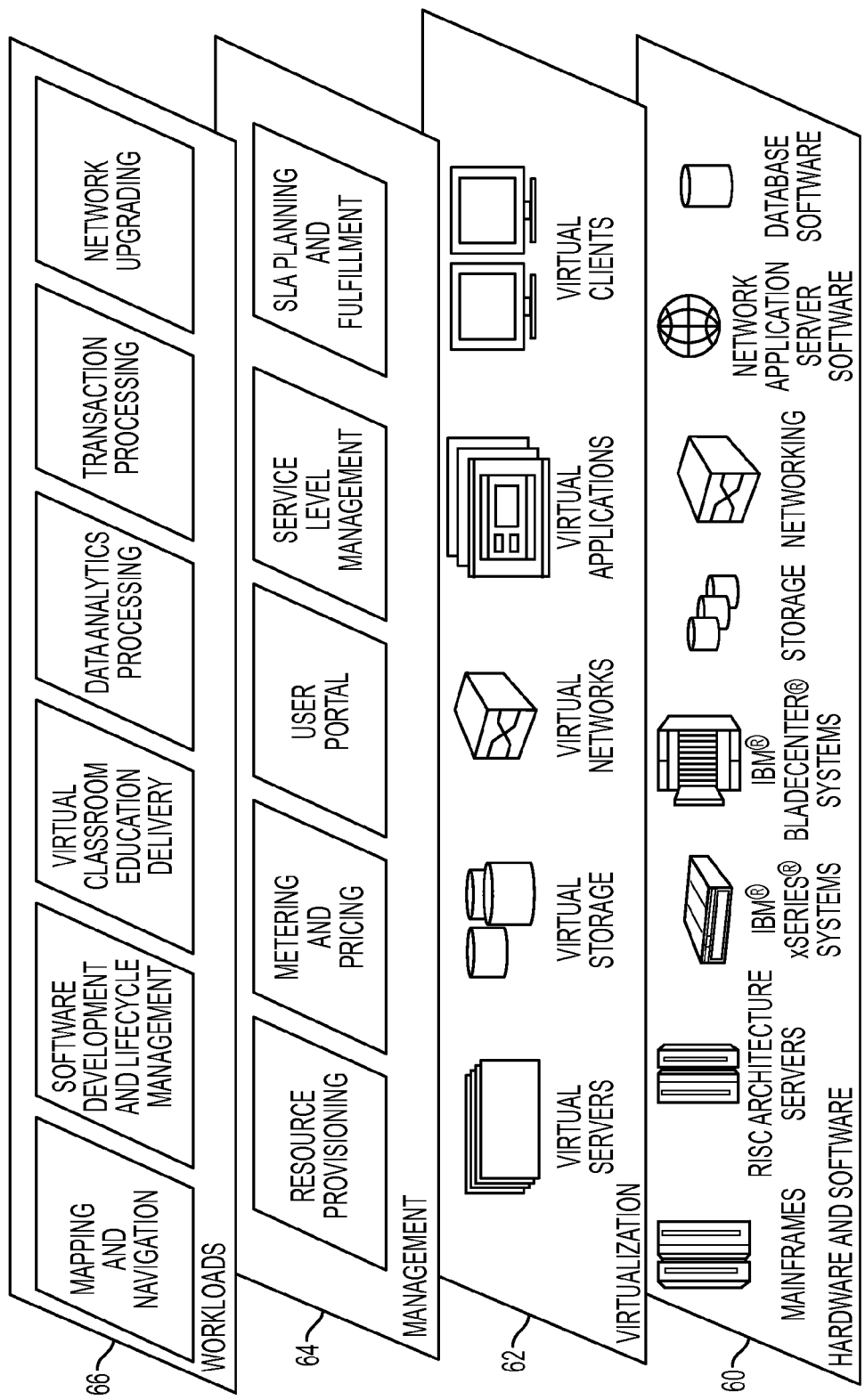
FIG. 3 depicts abstraction model layers according to yet another embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 may include hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 66 provides examples of functionality for which the cloud computing environment may be utilized. Examples of workloads and functions that may be provided from this layer include: mapping and navigation; software development and lifecycle management; virtual classroom education delivery; data analytics processing; transaction processing; and network upgrading.

In general, embodiments of the present invention may provide HA in a network and a hitless upgrade mechanism where downtime of a controller may be avoided thus achieving zero downtime for failovers and zero downtime for controller upgrades.

In some embodiments, HA may be achieved according to the following general steps. An underlying application may create a new controller instance on a same or different physical server that includes a controller being replicated. A new VM with the new controller may be added into a multicast group to receive control packets. The new VM and controller may be designated as being on stand-by. The stand-by controller instance may be enabled. The controller being replicated and the stand-by controller may be synchronized for runtime state.

In some embodiments, an In Service Software Upgrade (ISSU) or hitless upgrade of the stand-by controller may be achieved according to the following general steps. A newer version of an upgraded application may be installed on the operating system of an existing VM, for example, the VM with the controller being replicated. Synchronization of local processes may be performed. Local dynamic libraries may be installed. Switchover may use new processes while aborting old processes.

Figure 4:
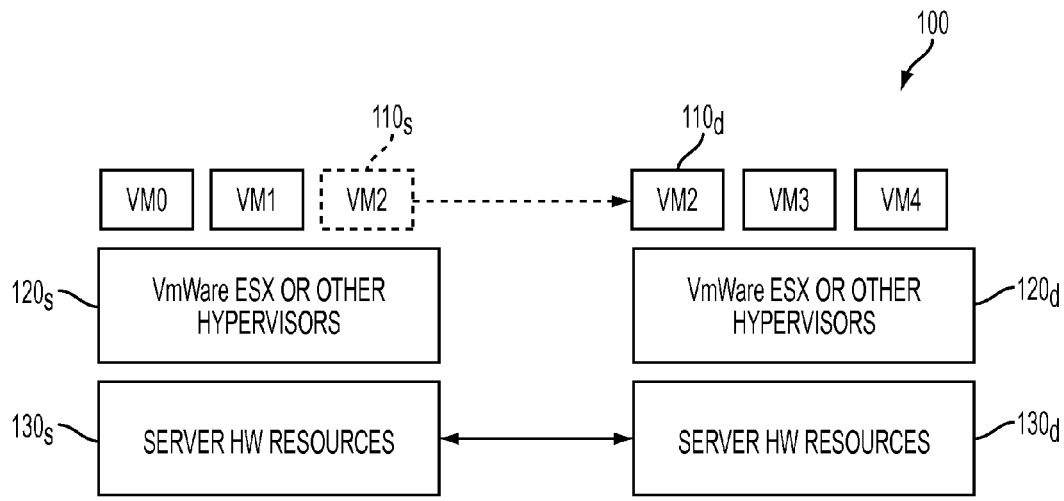
FIG. 4 is a block diagram of a migration process according to still another embodiment of the present invention.

Referring to FIG. 4, a migration process 100 is shown according to an exemplary embodiment of the present invention. A new controller instance may be created by the migration process 100. In an exemplary embodiment, the controller instance(s) may be controlled by a VM(s). A migration application (not shown) may migrate or transfer a snapshot of live VMs from one physical server (not shown) to another physical server without downtime and with complete transaction integrity. Elements involved in the migration process 100 may include the VMs 110, a hypervisor 120, and server hardware resources 130. Source side elements may be designated with an "s" subscript on their respective reference numbers and destination side elements may be designated with a "d" subscript on their respective reference numbers. The hypervisor mechanism 120 employed may be VmWare's™ ESX™ application.

The migration process 100 may be used to create a controller VM 110 on a same or another physical server. For example, a source controller VM $110_s$, instance (labeled as "VM2") may, in a current instance, be operating in an environment with "VM0" and "VM1". "VM2" may be replicated as a stand-by controller VM (or replica controller VM $110_d$) to operate in an environment with "VM3" and "VM4". A source hypervisor mechanism 130 may store an entire state of "VM2" as a master controller VM 110 on a shared networked storage device (not shown). The stored states may be stored in the form of one or more shared files. The storage devices may be, for example, Fiber Channel, iSCSI SAN, NAS or FCoE storage devices. Multiple hypervisor installations may have access to these shared files simultaneously.

The active memory and precise execution state of "VM2" may be rapidly transferred over a high speed network, allowing the virtual machine to instantaneously switch from running on the source hypervisor $120_s$, host to the destination hypervisor $120_d$ host. In an exemplary embodiment, the transfer period may be imperceptible to users by keeping track of on-going memory transactions in a bitmap. Once the entire memory and system state data have been copied over to the destination hypervisor $120_d$ host, the source controller VM $110_s$, may copy the bitmap to the target destination hypervisor $120_d$ host. The migration process 100 may resume operation of "VM2" on the destination hypervisor $120_d$ host.

In an exemplary embodiment, rather than suspending operation of the source controller VM $110_s$, the source controller VM $110_s$ may be kept running without any disturbance. After the replication, the source controller VM $110_s$ may be operated as a master controller VM and the newly instantiated replica controller VM $110_d$ may be operated as a stand-by controller VM. This may be achieved, for example by changing the value of one of the global parameters in the platform process of the newly replicated VM. The source controller VM $110_s$ may be forced to perform a memory transaction in order to change the global parameter value. The replica controller's VM $110_d$ platform process may check the value of this parameter to decide the role it should play. After that, the destination hypervisor $120_d$ may provide a new MAC address to the replicated controller VM $110_d$. This task can also be achieved by the source controller VM $110_s$ by either sending a new message or by creating a new memory transaction. The source controller VM $110_s$ (master controller VM) may initiate a heartbeat mechanism with the replica controller VM $110_d$ (standby controller VM). Even though the replica controller VM $110_d$ may have resumed execution, all the processes of this VM may either be in a suspended state or in an artificial wait state, waiting for a message from the platform process.

Figure 5:
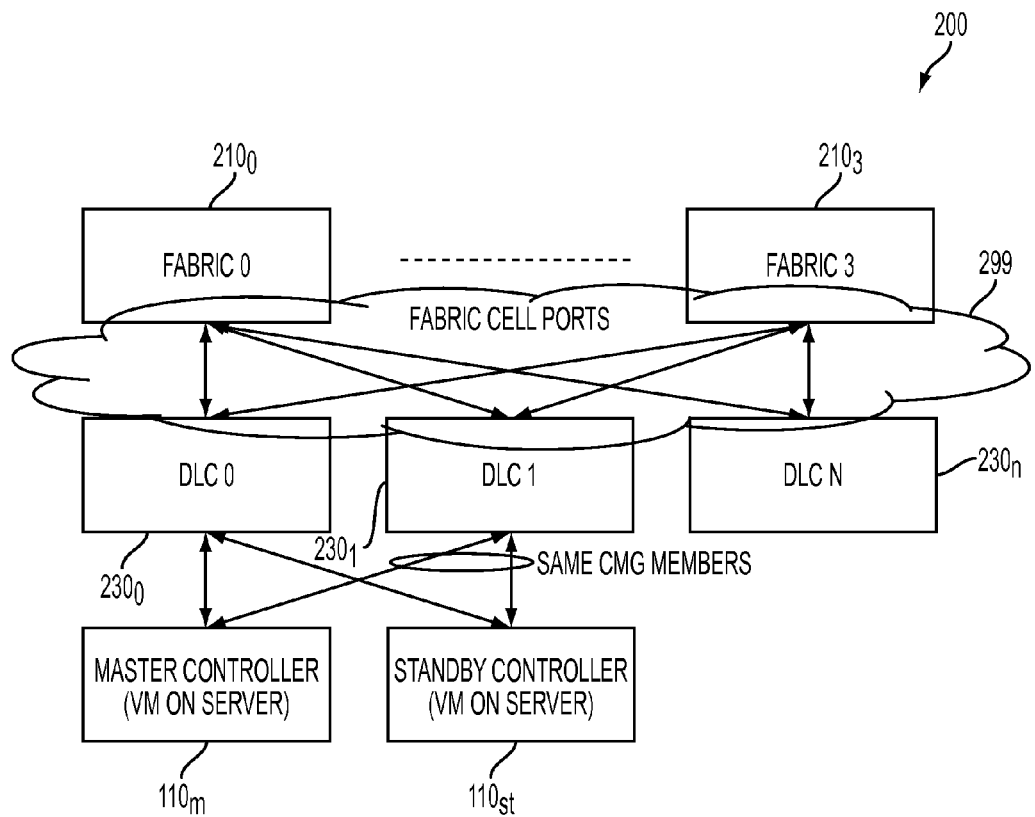
FIG. 5 is a block diagram of a cell based distributed fabric protocol (CDFP) configuration according to still another embodiment of the present invention.
Figure 6:
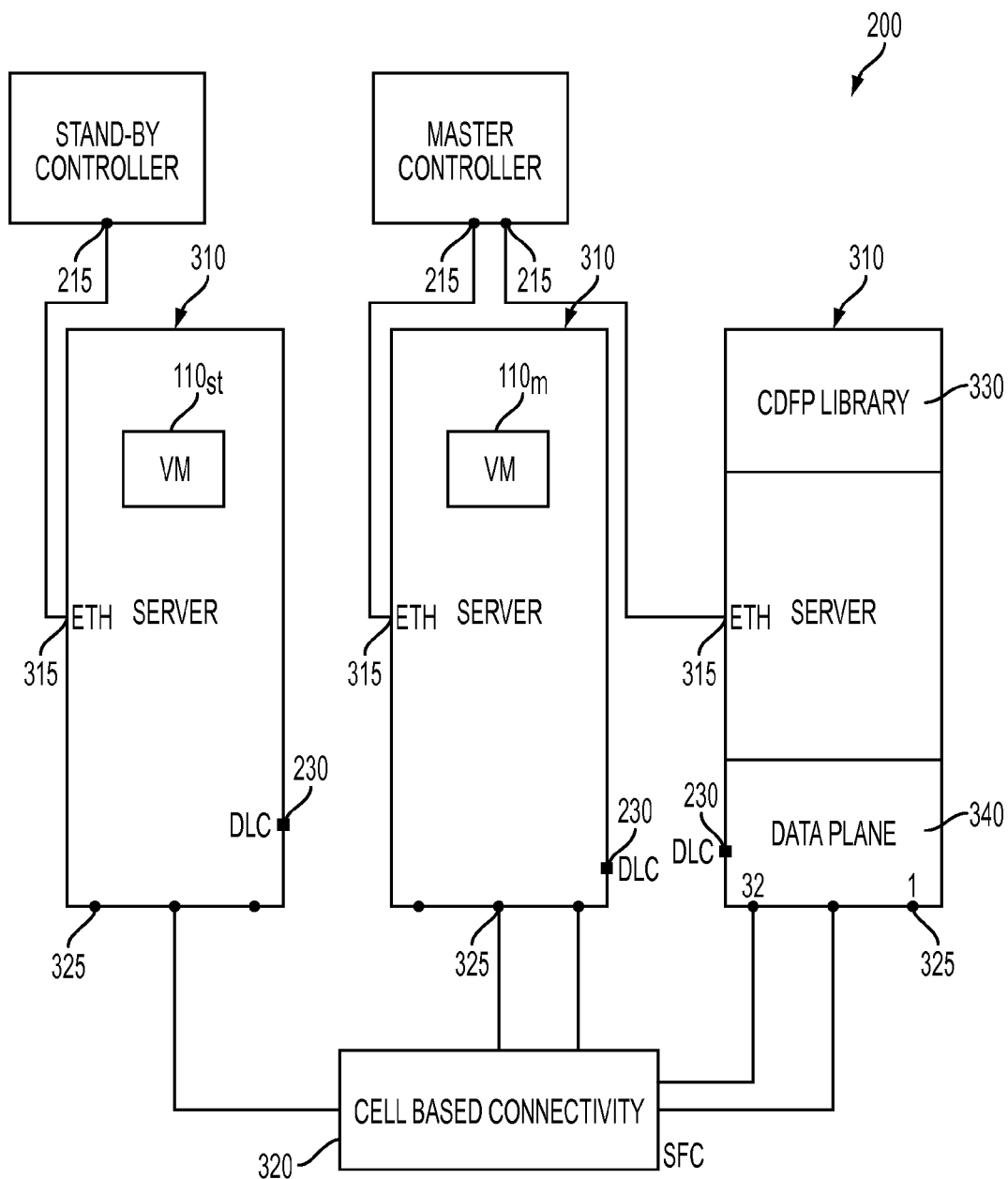
FIG. 6 is a block diagram of a CDFP connection of FIG. 4 with a master and stand-by controller according to still yet another embodiment of the present invention.

Referring to FIGS. 5 and 6, a cell based distributed fabric protocol (CDFP) configuration 200 is shown according to an exemplary embodiment of the present invention. FIG. 5 shows controllers 220 connected in general to switching elements in distributed fabrics 210 through a cloud network 299. In an exemplary embodiment, the fabrics may be part of one or more multicast groups. FIG. 6 shows details of cell based connectivity 320 with the servers 310 and the controllers 220. For a CDFP based application, a controller 220 may be run by a controller VM 110 on a physical server 310 which may be directly connected to one or more Ethernet ports 315 of a distributed line card 230 (DLC). In FIG. 6, for sake of illustration the Ethernet ports 315 are shown connected around various points on the periphery of physical servers 310 while DLCs 230 are shown as represented by a small square in one location. However, it will be understood that the Ethernet ports 315 may be connected to the DLCs 230 wherever placed on a server 310. For the embodiments described with respect to FIGS. 5 and 6, the source controller VM of FIG. 4 will be referred to as the master controller VM $110_m$ while the replicated controller will be referred to as the stand-by controller $110_{st}$.

The physical servers 310 may be configured so that multiple servers 310 provide a common data plane 340. Physical servers 310 running the master controller VM $110_m$ and stand-by controller VM $110_{st}$ may also be connected to one or more Ethernet ports 315 of respective DLCs 230. A DLC network packet processor ASIC may encapsulate exception packets into another layer 2 multicast Ethernet packet and forward them to a specific multicast group. These exception packets may be network control protocol PDUs and may be sent to a CPU (FIG. 1) over a CPU port 215. The CPU ports 215 may be directly connected Ethernet ports to the physical servers 310 running controller VMs $110_m$ and $110_{st}$. The multicast group may be the group created by the DLC platform during boot up. At least one port each from master controller VM $110_m$ and standby controller VM $110_{st}$ may be members of this group. This way, the master and standby controllers receive the same copy of the exception packet. In this architecture, this multicast group may be referred to as a controller multicast group (CMG).

The master controller $110_m$ being the main controller by functionality may have all the knowledge of the stand-by controller VM $110_{st}$ including the physical ports it is connected to. This information may be used by the master controller VM $110_m$ to program all the DLCs 230 to include new physical ports in the CMG that may be added as a result of joining the standby controller VM $110_{st}$. When the DLCs 230 are programmed, the standby controller $110_{st}$ may start receiving control protocol PDUs. In some embodiments, the stand-by controller VM $110_{st}$ may decide to ignore PDUs and rely on sync messages from the master controller VM $110_m$.

In some embodiments, intermediate memory transactions may be performed for runtime updates. For example, updates that occurred in master controller VM $110_m$ may be automatically synchronized with the standby controller VM $110_{st}$ without any individual processes performing state sync with peer processes. For example, hypervisors 120 (FIG. 4) may be configured to create programmable interval based memory transactions to update system states.

Figure 7:
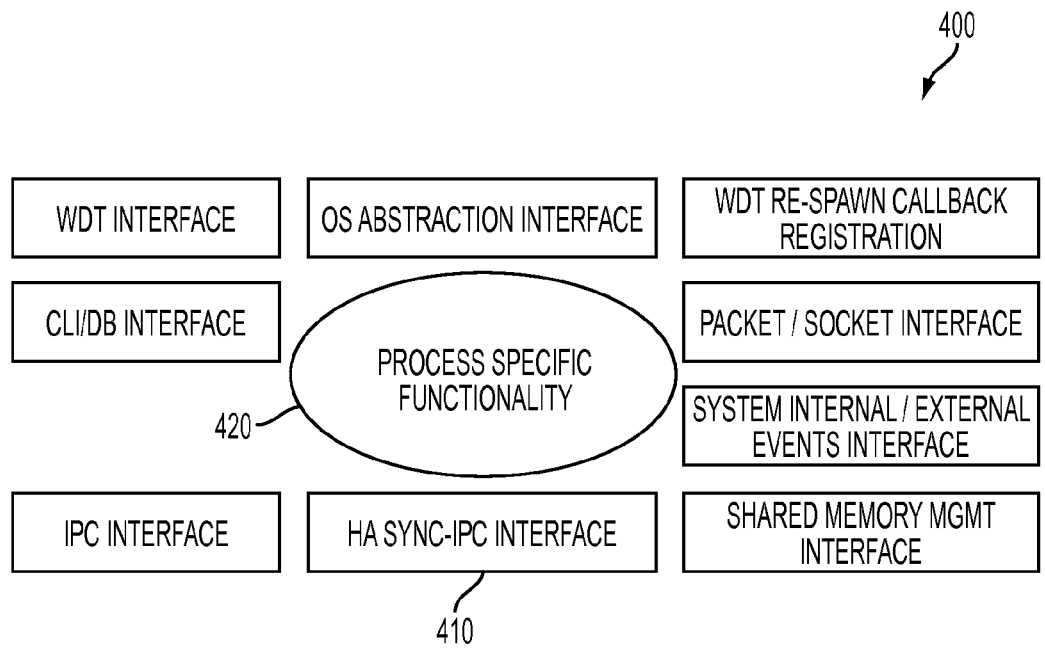
FIG. 7 is a block diagram of an upgrade architecture according to still yet another embodiment of the present invention.

Referring now to FIG. 7, an in service software upgrade (ISSU) or hitless upgrade architecture 400 is shown according to an exemplary embodiment of the present invention. The architecture may be used for example, in a single controller VM 110 upgrade. An ISSU or hitless upgrade mechanism may provide runtime patching of a system without resetting the data plane/forwarding plane. The architecture 400 may categorize the controller VM 110 components. For example, processes may include user space application processes 420 which contribute towards the functionality of the controller VM 110. Each process may follow a common process model. Each process may have an IPC interface 410 which may communicate to local peer process for synchronization. Dynamically loadable libraries (DLLs) may be included which may generally be installed during runtime and may provide important functional APIs for controller functions. Statically linked libraries may generally be linked at compile time and may provide important functional APIs for controller functions. Shared memory blocks or handles may hold important data structures for the controller VMs 110. Shared memory blocks may be shared by multiple processes 420. Kernel or user space drivers may include device drivers according to appropriate devices being used.

Figure 8:
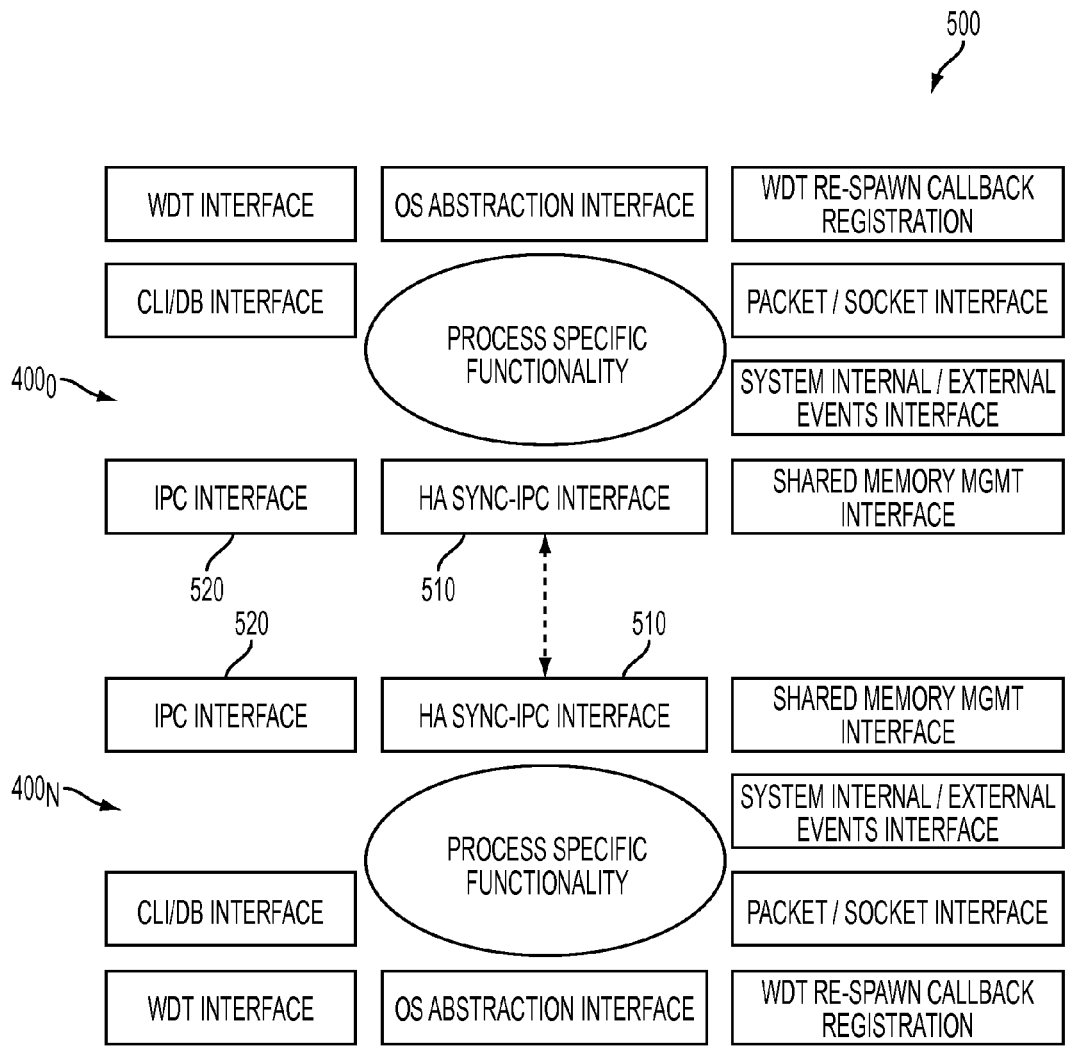
FIG. 8 is a block diagram of an upgrade architecture replicating processes according to still yet another embodiment of the present invention.

Referring now to FIG. 8, an upgrade architecture 500 is shown according to an exemplary embodiment of the present invention. The architecture 500 may be useful when upgrading using two or more controller VMs 110. The controller upgrade architecture 500 may install a newer version $400_N$ of controller application software while an old version $400_O$ is still running. The underlying operating system which is part of the controller VM 110 may remain unmodified. Controller application software processes along with the new controller application software may reside on the same operating system. Due to this step, a controller operating system may see a duplicate process for each existing user space application process. As soon as the newer version $400_N$ processes are spawned, the controller operating system may check for the existence of the previous processes from the old software version $400_O$. The processes may then exchange version numbers with each other. By checking the version numbers, the controller operating system may identify the spawned process as an upgrade or downgrade. If the spawned process has a higher version number than a currently installed process, then the code may register as Operation=UPGRADE. If the spawned process has a lower version number than the currently installed process, then the code may register as Operation=DOWNGRADE. If the version numbers are same, the processes are redundant and one process may become the stand-by of the other.

Each version $400_N$ and $400_O$ may have an inter process communication (IPC) interface 520. The IPC interface 520 may be a socket based communication interface using an HA synchronization IPC interface 510. The two headed arrow line showing communication between the two HA synchronization interfaces 510 may represent a virtual medium of communication, for example, through either sockets of TCP, UDP, or shared memory etc. Every process when spawned may try to establish communication to a reserved socket number called UPGRADE_<PROC_NAME>_IPC_SOCK_ID. Here the "<PROC_NAME>" may be the predefined name of the process or a predefined string which is unique. If the connection fails, a check for the socket id may be made. If the socket id does not exist, the spawned process may become a server process and may use the socket number UPGRADE_<PROC_NAME>_IPC_SOCK_ID to open a server socket and wait on the socket. If the socket connection is established then UPGRADE_<PROC_NAME>_IPC_SOCK_ID exists. The newly spawned processes may become a client process and may wait for the state upgrades from the server process.

When a newly installed process establishes connection with an old process, the processes may move to a process synchronization state. The older process which may be a server process may run some sanity checks on the new process in order to establish a proper identity. If the sanity check fails, the server process may stop communication with the new process and may disconnects the established socket communication by sending a TCP RESET if TCP is used. The server process may also black list rogue processes to avoid Denial of Service (DOS) attacks.

After a successful sanity check, the server and client processes may prepare themselves for state and data synchronization. The processes may send state and data information over the socket or may send the information about shared memory maps. The data structures may be incremental data structures. If the server process is from a lower version number and the client process is a newer version number (for example, Operation=UPGRADE), the client process may use dynamically loadable library (DLL) functions written especially for upgrades. The library functions may take older data structures from server process and convert them to newer data structures. In a downgrade, the client process may take the data structures from the server process and may convert them to the older data structures. This may depend upon the size of the older data structures. The client process may copy the size of data structures it knows. The rest of the data may optionally be used or thrown away.

Thus all the newly installed processes may work with their counter-part processes to synchronize state and data structures. After the synchronization, each process may inform the main platform process (for example a HA process or Watch Dog Timer process) about the state of the synchronization. The server processes then wait for an abort signal or an abort message from the new platform process.

As part of the ISSU, the DLLS may be stateless and may not keep any global data. DLLs may be installed before the new processes are spawned as part of an upgrade or a downgrade. An option may keep the same DLLs if the DLLs are not changed for functionality or other changes.

As soon as the platform process receives confirmation from all the application processes about the completion of the synchronization, the platform process may send an abort message or an abort signal to the older processes. The newly installed processes may start execution and processing of control packets as per their functionality. After the sanity checks (optional), the platform process may declare the failover complete.

Figure 9:
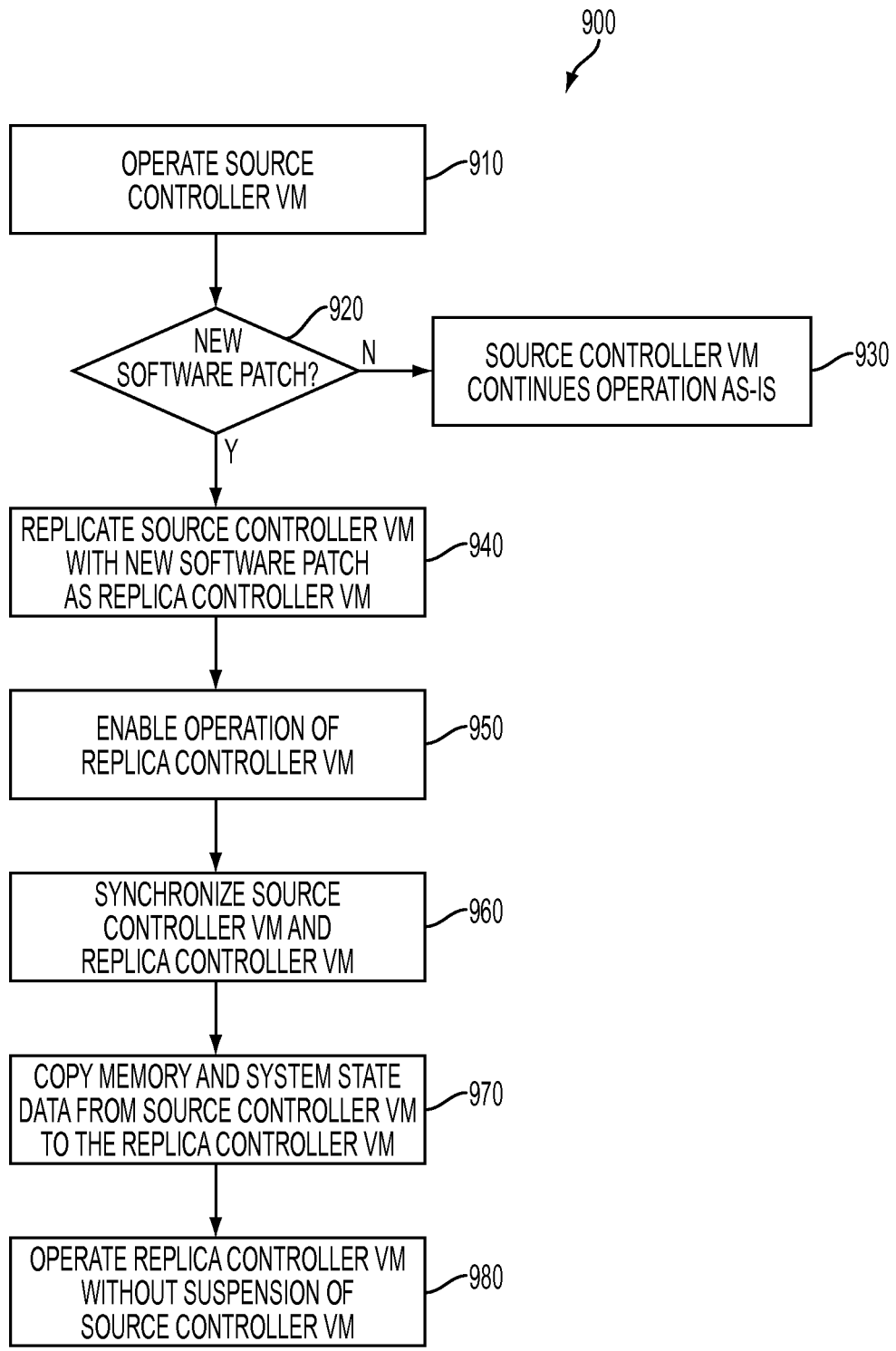
FIG. 9 is a flow chart of a method of installing a software patch in a system according to still yet another embodiment of the present invention.

Referring now to FIG. 9, a method 900 of installing a software patch in a system is shown. An operating system may operate (910) the source controller. The operating system may determine (920) if a new software patch is available. If not, the operating system continues operating (930) the source controller without modification. If so, the operating system may replicate (940) the source controller into a replica controller. The replica controller may include the software upgrade. The operating system may enable (950) operation of the replica controller. The operating system may synchronize (960) the source controller with the replica controller. The operating system may copy (970) memory and system state data from the source controller to the replica controller. The operating system may operate (980) the replica controller without suspension of the source controller.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of installing a software patch in a system, comprising:
    operating a first controller virtual machine on a network server;
    determining whether a new software patch for the first controller virtual machine is available;
    responsive to determining that the new software patch for the first controller virtual machine is available, replicating the first controller virtual machine with the new software patch into a replica controller virtual machine in the system;
    enabling the replica controller virtual machine;
    synchronizing the first controller virtual machine with the replica controller virtual machine;
    copying memory and system state data from the first controller virtual machine to the replica controller virtual machine;
    responsive to copying memory and system state, copying a bitmap of on-going transactions from the first controller virtual machine to the replica controller virtual machine; and
    operating the replica controller virtual machine without suspending the first controller virtual machine.

2. The method of claim 1, wherein the replica controller virtual machine is replicated onto the network server on which the first controller virtual machine is operating.

3. The method of claim 1, wherein the network is operated under a cell based distributed fabric protocol (CDFP).

4. The method of claim 1, wherein the synchronization step includes synchronizing state updates.

\* \* \* \* \*